Patented Dec. 10, 1935

2,023,479

UNITED STATES PATENT OFFICE 2,023,479

CONDENSATION PRODUCTS OF THE AZA-BENZANTHRONE-ACRIDINE SERIES AND THEIR PRODUCTION

Max Albert Kunz, Mannheim, and Karl Koeberle and Gerd Kochendoerfer, Ludwigshafen-on-the-Rhine, Germany, assignors to General Aniline Works, Inc., New York, N. Y., a corporation of Delaware No Drawing. Application March 30, 1933, Serial No. 663,648. In Germany October 26, 1932

14 Claims. (Cl. 260—36)

The present invention relates to new valuable condensation products of the azabenzanthrone series and a process of producing same.

We have found that valuable nitrogenous condensation products are obtained by treating with condensing agents azabenzanthrones which are connected in one peri-position with an organic radicle by means of a linking member which may be a nitrogen, oxygen, sulphur (—S— or —S—S— or selenium or —CO— bridge. Hereby products are formed corresponding to the general formula

wherein X stands for an azabenzanthrone radicle, Y for a nitrogen, oxygen, sulphur, selenium or —CO— bridge and Z for an organic radicle, at least the linkage X—Y being attached to a peri-position of the azabenzanthrone radicle; preferably the two linkages attached to X are in the two peri-positions of the azabenzanthrone. Thus for example from Bz.1-alpha-anthraquinonylamino-8-azabenzanthrone by treatment with sulphuric acid or chlorsulphonic acid, an orange-yellow dyeing condensation product is obtained which is probably a carbazol derivative corresponding to the formula

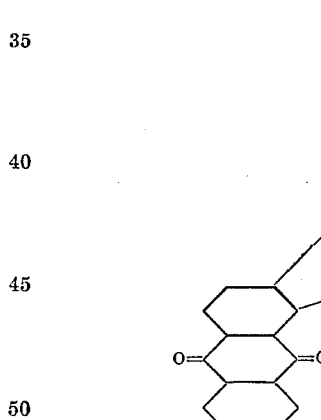

By treatment with alcoholic potash, Bz.1-alpha-anthraquinonyl-amino-8-azabenzanthrone yields an olive-green dyeing acridine derivative corresponding probably to the formula

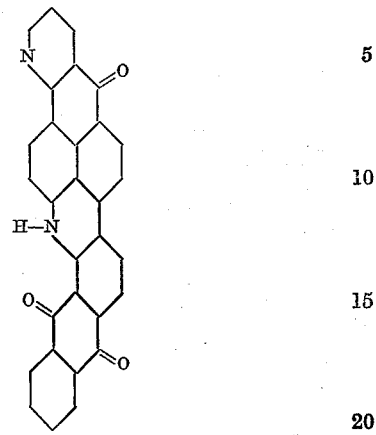

Bz.1-N-pyrazolanthronyl-8-azabenzanthronyl is converted into 8-azabenzanthronepyrazolanthrone. From the reaction product of thioglycollic acid or an anthraquinonemercaptan on Bz.1 - brom - 8 - azabenzanthrone, condensation products containing sulphur are obtained by alkaline condensation. The condensation of the reaction product of thioglycollic acid with Bz.1-brom-8-azabenzanthrone probably leads to a product of the following formula:

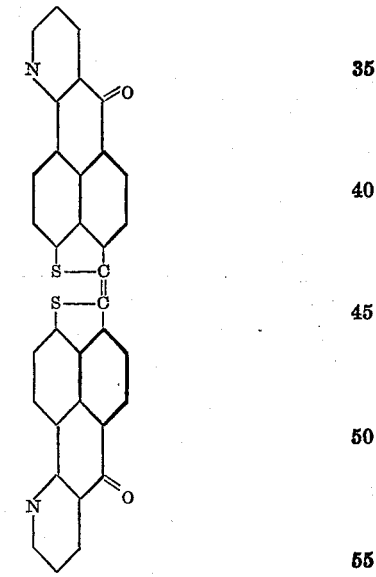

The procedure is similar in the case of selenium-containing or oxygen-containing peri-substitution products of the said kind. The condensation of 2-benzoyl-8-azabenzanthrone by means of aluminium chloride and sodium chloride and oxygen yields a product corresponding probably to the formula

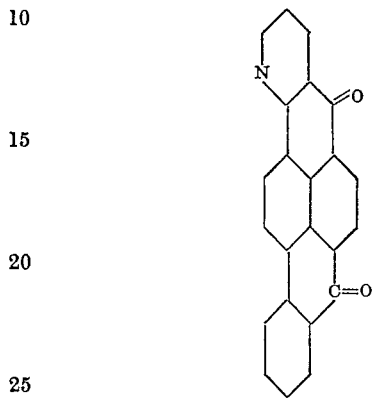

The said azabenzanthrones may also contain further substituents as for example amino, imino, acylamino, hydroxy, alkoxy, phenoxy, alkyl, aryl, nitro, sulphonic, cyano and thiocyano groups.

Acid and alkaline condensing agents may be used, as already mentioned above. Aluminium chloride, if desired in combination with other chlorides and with air, may be employed also. The condensation may be carried out in the presence or in the absence of organic solvents or diluents. Usually it is effected at between 100° and 220° C., but lower or higher temperatures may be used also.

If initial materials are used containing in one peri-position an organic radicle fixed by means of a —S—S— group, one S atom is split off and similar products are obtained as is the case when starting with materials containing a simple —S— bridge.

The condensation products are usually obtained in good yields and in a good state of purity and are in part already dyestuffs and in part intermediate products for example for the preparation of vat dyestuffs. They may if necessary be purified by the usual methods, as for example by crystallization, by purification by way of their salts, by treatment with oxidizing agents or by vatting. In cases when the initial materials contain free hydroxyl or amino groups, these may be alkylated or acylated simultaneously with the condensation or the resulting condensation products may be alkylated or acylated. Azabenzanthrones of the said kind may be obtained for example according to the copending specification Ser. No. 663,645, filed on March 30, A. D. 1933 by Kunz and Kochendoerfer and specification Ser. No. 663,647, filed on March 30, A. D. 1933 by Kunz, Kochendoerfer and Koeberle. The term "azabenzanthrone" is employed with reference to the nomenclature suggested by the Commission ordered by the International Union for Chemistry (c. f. Journal of the American Chemical Society, vol. 55, pages 3905 to 3925, 1933): it means benzanthrones one —CH— group of which is replaced by an N-atom. According to the aforesaid copending application Serial No. 663,645, 5-, 8-, and Bz 3-azabenzanthrones are obtainable. These compounds are represented by the formula

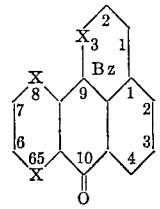

wherein one X is N, the other X's being —CH—.

The condensation products obtained as described before may be halogenated in the usual manner by treatment with halogen or agents supplying halogen in the presence or absence of diluents and/or of catalysts. They may also be nitrated, as for example with nitric acid of high percentage strength or with nitric acid diluted with organic or inorganic solvents or with salts of nitric acid in acid solution.

The negatively substituted products may then be condensed with amino compounds such as aminoanthraquinones, hydroxy compounds or their salts, or mercapto compounds or their salts. The said condensation is preferably effected in organic solvents or diluents such as nitrobenzene, naphthalene, halogen benzene, diphenyl, diphenylether and quinoline. Acid-binding agents and catalysts are used with advantage; suitable acid-binding agents are for example alkali and alkaline earth metal carbonates, acetates and further salts of the said metals and earth alkali metal oxides; suitable catalysts are for example copper and its compounds. The products of this condensation are generally obtained in good yields. They are usually vat dyestuffs of good fastness; they may be used also as intermediate products in the production of dyestuffs.

The following examples will further illustrate the nature of this invention but the invention is not restricted to these examples. The parts are by weight.

*Example 1*

10 parts of Bz.1-alpha-anthraquinonylamino-8-azabenzanthrone (prepared for example from Bz.1-brom-8-azabenzanthrone and alpha-aminoanthraquinone) are introduced while stirring into a melt of 200 parts of caustic potash and 200 parts of ethyl alcohol at a temperature of 130° C., the whole being heated at from 140° to 145° C. after the completion of the introduction until unchanged initial material can no longer be detected. The melt is then taken up in hot water, any fractions of the reaction product present in reduced form are separated by blowing with air, filtered by suction and washed until neutral. The reaction product obtained in a very good yield dissolves in concentrated sulphuric acid giving a blue coloration and yields powerful olive-green dyeings of very good fastness on vegetable fibres from a violet vat.

*Example 2*

The condensation product obtainable from Bz.1-brom-8-azabenzanthrone and pyrazolanthrone is fused with alcoholic potash as described in Example 1. The reaction product obtained, is probably 8-azabenzanthronepyrazolanthrone, corresponding to the following formula

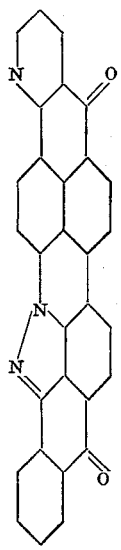

It is a violet powder which dissolves in concentrated sulphuric acid giving a green coloration and yields a green vat from which vegetable fibres are dyed blue-violet shades of excellent fastness.

If, instead of azabenzanthronylpyrazolanthronyl, a bromo product of the same, which may be obtained according to paragraph 2 of Example 9 of the said application Ser. No. 663,-647 (Kunz, Kochendoerfer and Koeberle), a reaction product yielding blue dyeings is obtained.

*Example 3*

25 parts of the condensation product derived from 1 molecular proportion of dibrom-8-azabenzanthrone and 2 molecular proportions of alpha-aminoanthraquinone are introduced at 130° C. into a melt of 200 parts of caustic potash and 160 parts of alcohol, then the whole is heated to 140° to 145° C. until unchanged initial material can no longer be detected and then taken up with hot water. The condensation product obtained dissolves in concentrated sulphuric acid giving a blue-green coloration and yields olive-gray dyeings of excellent fastness on cotton from a brown-olive vat.

In an analogous manner, a reaction product which dyes cotton neutral grey shades is obtained from the condensation product derived from 1 molecular proportion of Bz.1-brom-8-azabenzanthrone and ½ molecular proportion of 1.5-diaminoanthraquinone by fusion with alcoholic potash.

*Example 4*

10 parts of Bz.1-alpha-anthraquinonylamino-8-azabenzanthrone are heated at from 130° to 140° C. in 100 parts of concentrated sulphuric acid until the originally green solution has become brown. The mixture is then allowed to cool, poured onto ice, filtered by suction, washed until neutral and dried. The reaction product obtained, probably a carbazol derivative, yields a wine-red vat from which cotton is dyed orange-yellow shades.

*Example 5*

20 parts of the condensation product derived from 1 molecular proportion of Bz.1-brom-8-azabenzanthrone and 1 molecular proportion of 1.5-diaminoanthraquinone are fused at from 125° to 130° C. as described in Example 3. The melt is taken up in hot water, blown with air and filtered by suction. The resulting condensation product dissolves in concentrated sulphuric acid giving a blue coloration, yields a brown-violet vat and dyes vegetable fibres grey shades of very good fastness.

A reaction product having similar properties is obtained by the alkaline condensation of Bz.1-(5-benzoylamino-1-anthraquinonylamino)-8-azabenzanthrone, prepared for example from 1-amino-5-benzoylaminoanthraquinone and Bz.1-brom-8-azabenzanthrone.

If the condensation product obtained according to paragraph 1 be treated with benzoyl chloride in the presence of nitrobenzene, an acylation product is obtained which dissolves in concentrated sulphuric acid giving a green-blue coloration and yields olive dyeings of excellent fastness on cotton from a violet vat.

*Example 6*

50 parts of the acylamine obtainable from 1 molecular proportion of dibrom-8-azabenzanthrone obtainable according to Example 2 of the copending application Ser. No. 663,647, filed by Kunz, Kochendoerfer and Koeberle, 1 molecular proportion of pyrazolanthrone and 1 molecular proportion of alpha-aminoanthraquinone are introduced at 130° C. into a melt of 300 parts of caustic potash and 250 parts of alcohol and heated at 145° C. while stirring until unchanged initial material can no longer be detected. The whole is worked up in the usual manner and a condensation product is obtained corresponding probably to the formula and dissolving in concentrated sulphuric acid giving a green coloration and yielding grey dyeings of excellent fastness on cotton from a green vat.

*Example 7*

15 parts of the condensation product obtainable according to Example 1 in 200 parts of nitrobenzene are heated for 2 hours at 100° C.

after the addition of 1.5 parts of iodine and 22 parts of sulphuryl chloride, then for 2 hours at 110° C., allowed to cool and filtered by suction. The resulting chlorination product is a green crystalline powder having a metallic lustre which dissolves in concentrated sulphuric acid giving a green coloration and yields very fast dark green dyeings from a dark violet vat.

In an analogous manner a reaction product giving olive-green dyeings may be obtained from the said initial material by treatment with bromine in chlorsulphonic acid at from 65° to 70° C. The bromination product obtainable by bromination in nitrobenzene in the presence of iodine and iron also yields olive-green dyeings.

Example 8

31 parts of the condensation product obtainable from Bz.1-brom-azabenzanthrone and 1-amino-5-methylaminoanthraquinone are fused for several hours at 145° C. in 200 parts of caustic potash and 160 parts of alcohol. The melt is then taken up with hot water. The leuco compound thus obtained is oxidized back again into the dyestuff by blowing with air and then filtered off by suction. The resulting reaction product yields grey dyeings of very good fastness on vegetable fibres from a dark violet vat.

Example 9

23 parts of the condensation product obtainable according to Example 2 are dissolved in 230 parts of chlorosulfonic acid, heated after the addition of 10 parts of bromine and 2 parts of iodine and kept for several hours at from 65° to 70° C. The whole is then allowed to cool and the melt precipitated by pouring into water. The reaction product is filtered off by suction, washed until neutral and made into a paste. It is a chloro-bromo derivative and yields blue dyeings of very good fastness from a blue vat.

The bromination may also be carried out while employing concentrated sulphuric acid as the solvent, or in aqueous suspension or in the absence of any diluent.

Example 10

23 parts of the condensation product obtainable according to Example 2 in 300 parts of nitrobenzene are slowly heated while stirring to 100° C. after the addition of 2 parts of iodine, 2 parts of iron and 30 parts of bromine, kept for an hour at 100° C., heated to 170° C., kept for some hours at the latter temperature, allowed to cool and filtered by suction. The bromination product obtained in crystalline form dissolves in concentrated sulphuric acid giving a green coloration and yields violet dyeings of very good fastness from a blue vat.

If the said initial material be treated in nitrobenzene with 1.5 parts of sulphuryl chloride at from 80° to 120° C., a chlorine derivative is obtained in a crystalline form which yields very fast dyeings on cotton.

Example 11

23 parts of the condensation product obtainable according to Example 2 in 230 parts of nitrobenzene are stirred for some hours while cold after the addition of 50 parts of nitric acid of 98 per cent strength. The whole is then heated to 80° C. and kept at this temperature for some hours, then allowed to cool and the nitration product which separates in crystalline form filtered off by suction. It dissolves in concentrated sulphuric acid giving a green coloration, yields a blue vat and dyes the vegetable fibre powerful green shades which change to grey or black when treated with chlorine.

Example 12

6.4 parts of the bromination product obtainable according to Example 1 in 100 parts of naphthalene are boiled while stirring after the addition of 5 parts of alpha-aminoanthraquinone, 5 parts of calcined soda and 2 parts of copper oxide for from 8 to 10 hours and filtered by suction while hot. The condensation product obtained yields grey dyeings of excellent fastness from a blue-green vat. The product corresponds to the formula

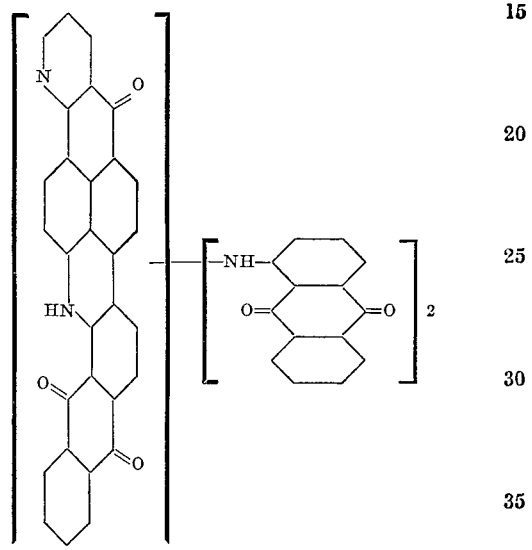

Example 13

6.4 parts of the product obtainable according to Example 9 in 200 parts of phenol are boiled for several hours while stirring after the addition of 20 parts of potash. The whole is then allowed to cool to about 100° C., diluted with 200 parts of toluene and filtered by suction. The reaction product obtained in the form of a blue powder dissolves in concentrated sulphuric acid giving a green coloration, yields a blue vat and dyes vegetable fibres powerful blue shades of very good fastness. The product corresponds to the formula

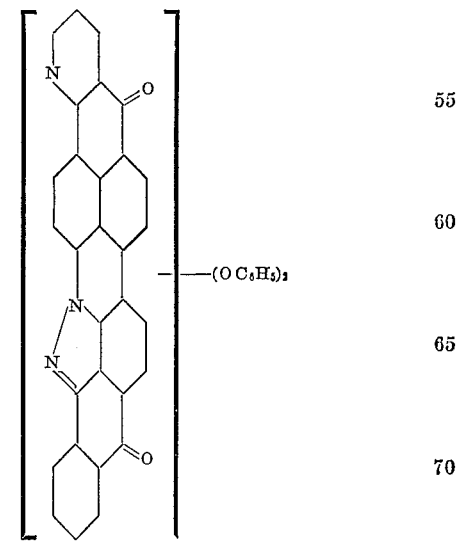

The corresponding condensation product obtained with 1-mercapto-2-aminoanthraquinone dissolves in concentrated sulphuric acid giving a green coloration and dyes grey-blue shades from a green vat. The product corresponds probably to the formula:

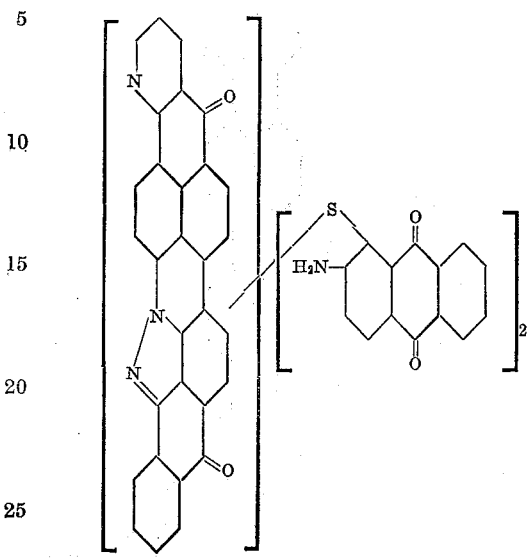

Example 14

A mixture of 10 parts of 2-benzoyl-8-azabenzanthrone, 150 parts of aluminium chloride and 30 parts of sodium chloride are heated to 180° to 190° C. for some hours while leading in oxygen. Then the melt is poured onto ice and the precipitate is filtered by suction. The reaction product is a grey powder dyeing cotton from an orange red vat orange shades. It may be purified, if desired, by usual methods, for example by crystallization or sublimation.

The initial material may be prepared by condensing benzylcyanide with 8-azabenzanthrone in an alkaline medium and oxidation of the reaction product thus obtained by means of chromic acid in glacial acetic acid. The product is a greenish yellow crystal powder melting at from 184 to 186° C.

Example 15

40 parts of the condensation product obtainable from Bz.1-brom-8-azabenzanthrone and 1-amino-5-methylaminoanthraquinone are heated for some hours to 140° to 145° C. in 200 parts of caustic potash and 160 parts of alcohol. Then water is added to the melt and air is introduced in order to oxidize that part of the reaction product which is present in the reaction mixture in the form of the leuco compound. The dyestuff obtained is filtered by suction. It dissolves in concentrated sulphuric acid giving a black-violet coloration, yields a violet-blue vat from which cotton is dyed greenish-grey shades of excellent fastness especially of a perfect fastness to chlorine.

The reaction may be carried out also with caustic potash alone instead of with caustic potash and alcohol.

Example 16

11.5 parts of sodium are introduced into a solution of 30 parts of alcohol in 100 parts of aniline while cooling. As soon as the sodium is completely dissolved 10 parts of the condensation product obtainable from Bz.-1-brom-8-azabenzanthrone and 1-amino-5-benzoylaminoanthraquinone are added by and by while stirring; the mixture is heated for 3 hours to 170° C. Then it is allowed to cool and diluted with water. Diluted hydrochloric acid is added whereby the solvent is removed and the reaction product precipitated is filtered by suction. It is an olive green powder, dissolving in sulphuric acid giving a greenish-blue coloration yielding a dark violet vat and strong yellowish olive dyeings of excellent fastness.

It corresponds to the formula:

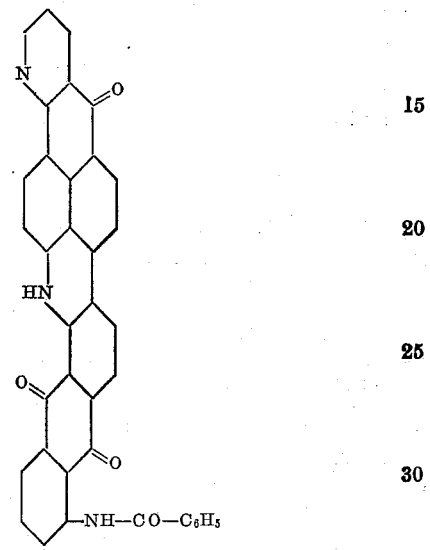

The reaction takes place in accordance with the following equation:

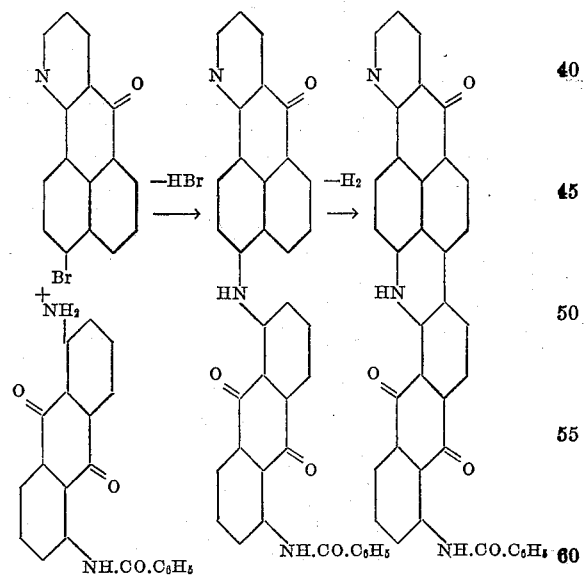

Instead of sodium ethylate other anhydrous condensing agents may be used, for example the sodium compound of aniline or sodium amide.

In a similar manner other condensation products of Bz.1-halogen-8-azabenzanthrone and aminoanthraquinones containing an aroylamino groups may be condensed, the aroyl group being retained in the product.

What we claim is:—

1. A condensation product of azabenzanthrone in which a cyclic compound is attached through a bridge to an azabenzanthrone nucleus at a peri-position on the latter, said product being a member of the group consisting of compounds of the following general formulae:

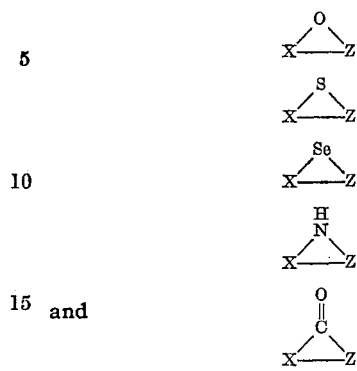

in which X represents an azabenzanthrone nucleus and Z represents an aromatic radical.

2. A condensation product of azabenzanthrone as defined in claim 1, in which the X represents an 8-N-azabenzanthrone nucleus.

3. A condensation product of azabenzanthrone in which an aromatic compound is attached to an azabenzanthrone nucleus at two adjacent positions on the latter, one of which positions is peri, said product corresponding the general formula

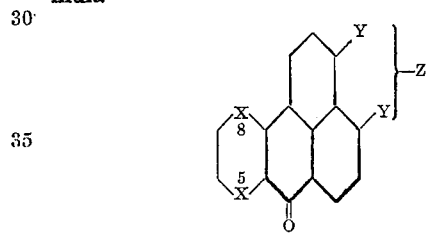

wherein one X represents an N atom, the other X being —CH—; Z represents an aromatic radical; and one Y represents an —NH— bridge.

4. A condensation product of azabenzanthrone as defined in claim 1, in which the aromatic radical is attached directly to the azabenzanthrone nucleus at the 2-position on the latter and is attached through the bridge to the azabenzanthrone nucleus at the Bz1-position on the latter.

5. Condensation products of the azabenzanthrone series corresponding to the formula

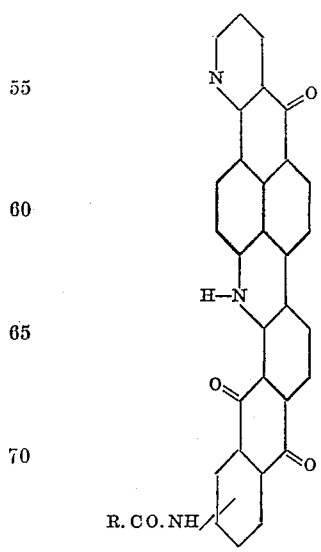

wherein R stands for an aromatic radicle.

6. Condensation products of the azabenzanthrone series corresponding to the formula

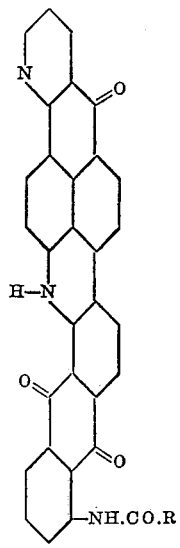

wherein R stands for an aromatic radicle.

7. Condensation product of the azabenzanthrone series corresponding to the formula

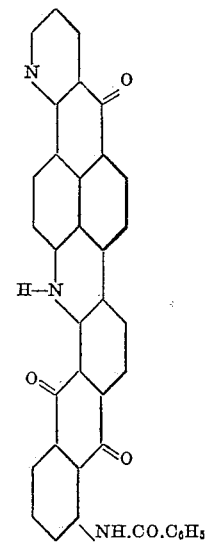

the said compound dissolving in concentrated sulphuric acid giving a blue coloration and yielding a brown-violet vat from which the vegetable fibre is dyed olive shades of very good fastness.

8. Condensation product of the azabenzanthrone series corresponding to the formula

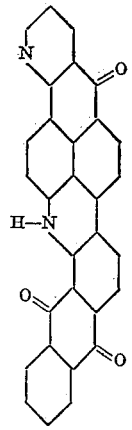

the said compound dissolving in concentrated sulphuric acid giving a blue coloration and dyeing the vegetable fibre powerful olive-green shades of very good fastness from a violet vat.

9. Condensation products of the azabenzanthrone series corresponding to the formula

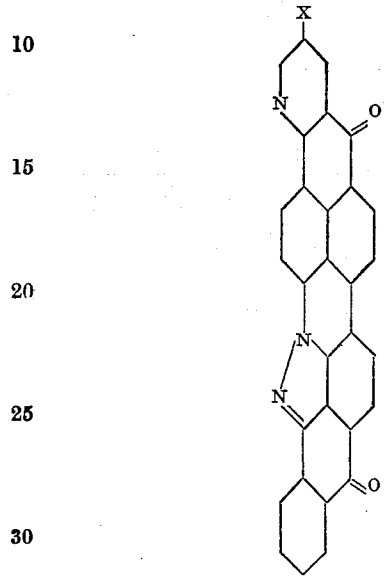

wherein X stands for hydrogen or an anthraquinone amino radicle, the said compound dissolving in concentrated sulphuric acid giving a green coloration and dyeing the vegetable fibre blue-violet shades of excellent fastness from a green vat.

10. Condensation product of the azabenzanthrone series corresponding to the formula

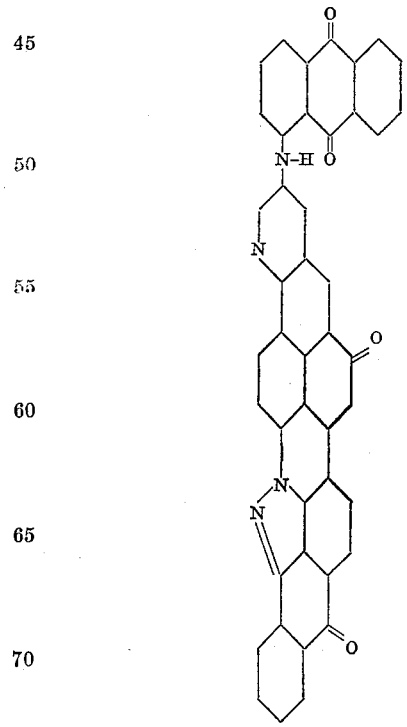

the said compound dissolving in concentrated sulphuric acid giving a green coloration and dyeing cotton grey shades from a green vat.

11. Condensation products of the azabenzanthrone series corresponding to the general formula:

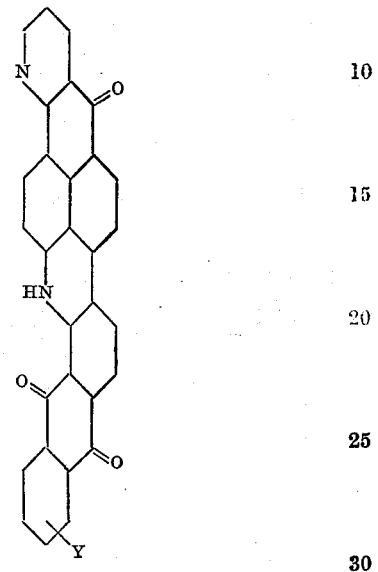

wherein Y represents hydrogen or an amino- or alkyl-amino group or the group —NH.CO.R (R being an aromatic radical).

12. Condensation products of the azabenzanthrone series corresponding to the general formula:

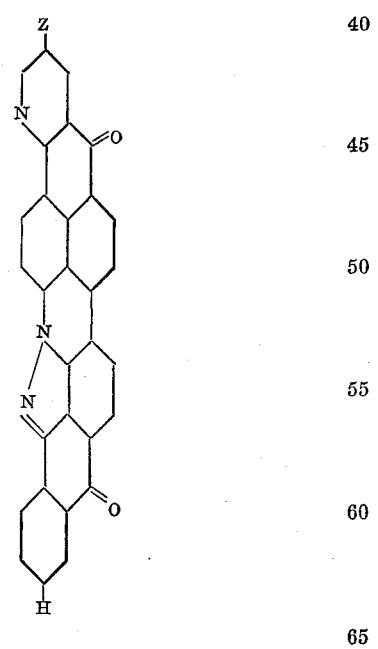

in which Z represents hydrogen or the group —NHA (A being an anthraquinonyl radical).

13. Process of producing a nitrogenous condensation product of the azabenzanthrone series which comprises treating with a condensing agent an azabenzanthrone compound in which an azabenzanthrone nucleus is connected in one peri-position with an organic radical through a bridge, said azabenzanthrone compound being a member of the group of compounds corresponding to the following general formulae:

and

in which X represents an azabenzanthrone nucleus and Z represents an aromatic radical.

14. Process of producing a nitrogenous condensation product of the azabenzanthrone series which comprises treating with a condensing agent an azabenzanthrone compound of the following formula:

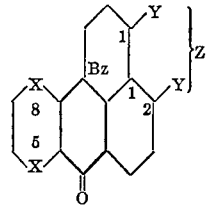

in which one X represents a nitrogen atom, the other X being —CH—; Z represents an aromatic radical; and one Y represents an —NH— bridge, the other Y being hydrogen.

MAX ALBERT KUNZ.
KARL KOEBERLE.
GERD KOCHENDOERFER.